United States Patent
Naik et al.

(10) Patent No.: US 7,386,379 B2
(45) Date of Patent: Jun. 10, 2008

(54) METHOD AND APPARATUS TO CONTROL COORDINATED WHEEL MOTORS

(75) Inventors: Sanjeev M. Naik, Troy, MI (US); Mutasim A. Salman, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 138 days.

(21) Appl. No.: 11/187,493

(22) Filed: Jul. 22, 2005

(65) Prior Publication Data

US 2007/0021875 A1 Jan. 25, 2007

(51) Int. Cl.
G06F 7/00 (2006.01)
B62D 11/02 (2006.01)
G05D 1/00 (2006.01)

(52) U.S. Cl. .................... 701/41; 701/72; 180/6.5

(58) Field of Classification Search .............. 701/1, 701/22, 23, 29, 34, 36, 41, 42, 43, 49, 69, 701/70, 71, 72, 82, 89; 180/6.48, 6.5, 408, 180/409, 410

See application file for complete search history.

(56) References Cited

U.S. PATENT DOCUMENTS

| | | | | |
|---|---|---|---|---|
| 5,258,912 A | | 11/1993 | Ghoneim et al. ............ | 701/42 |
| 6,292,734 B1 | * | 9/2001 | Murakami et al. .......... | 701/84 |
| 6,954,140 B2 | * | 10/2005 | Holler ....................... | 340/438 |
| 2001/0025210 A1 | * | 9/2001 | Tozu et al. .................. | 701/1 |
| 2003/0191574 A1 | * | 10/2003 | Kawai et al. ............... | 701/70 |
| 2003/0195689 A1 | * | 10/2003 | Mori .......................... | 701/70 |
| 2004/0064220 A1 | * | 4/2004 | Kobayashi .................. | 701/1 |
| 2004/0176203 A1 | * | 9/2004 | Supina et al. .............. | 475/8 |
| 2004/0267429 A1 | * | 12/2004 | Matsuno et al. ........... | 701/80 |
| 2005/0209752 A1 | * | 9/2005 | Ono et al. .................. | 701/41 |

* cited by examiner

*Primary Examiner*—Jack W. Keith
*Assistant Examiner*—Edward Pipala

(57) ABSTRACT

A method and system providing coordinated torque control and speed control of a vehicle equipped with individual wheel motors, a steering system, and yaw-rate detection to achieve a desired yaw moment for the vehicle, based upon operator input and vehicle operation, is described. This includes determining a commanded steering angle, and a yaw-rate error, based upon the commanded steering angle and detected yaw-rate. A desired wheel motor yaw torque moment is calculated. First and second torque moments are calculated for inner and outer motored wheels, based upon the desired wheel motor yaw torque moment. First and second ideal wheel speeds are calculated for the inner and outer motored wheels, based upon the commanded steering angle. Torque and speed at each inner motored wheel and each outer motored wheel are calculated, based upon the yaw-rate error, the first and second torque moments, and the first and second ideal wheel speeds.

8 Claims, 3 Drawing Sheets

METHOD AND APPARATUS TO CONTROL COORDINATED WHEEL MOTORS

TECHNICAL FIELD

This invention pertains generally to vehicle chassis control systems, and more specifically to control of motor wheels of a vehicle for improved steering characteristics during vehicle operation and turning.

INCORPORATION BY REFERENCE

Applicant incorporates by reference U.S. Pat. No. 5,258,912, entitled Wheel Understeer Speed Control, issued to Ghoneim, et al., in that the method and apparatus for controlling wheel speed during understeer not be fully described in detail herein.

BACKGROUND OF THE INVENTION

A vehicle operator typically expects a predictable correlation between a turning command and vehicle response. A conventional mechanical steering system, on a vehicle equipped with a single powertrain supplying a common motive power to the drive wheels, typically provides a mechanical link between a steering wheel and the turning wheels of the vehicle. The turning wheels turn in direct response to operator input to the steering wheel, through the mechanical linkage, regardless of whether they are motive wheels (e.g. front wheel drive) or non-motive wheels (e.g. rear wheel drive). Additionally, the motive power to each wheel is typically managed during a turning event to allow the vehicle to achieve a commanded turning radius, using mechanical or hydraulic means.

A vehicle equipped with individually actuated wheel motors provides challenges for systems during steering events, such as negotiating a curve. A significant aspect of successfully negotiating a curve comprises controlling relative wheel speed velocities between inner and outer wheels of the vehicle. Such vehicles include, by way of example, a hybrid vehicle. Regenerative braking systems, antilock braking, and traction control further confound the control of wheel speed during steering events.

Systems employing differential wheel motor speed control in response to a steering input are known in the art. However wheel motor speed control alone does not completely account for variations in vehicle operating conditions or vehicle operation, such as during regenerative braking operation or vehicle acceleration which may occur concurrently with a turning event. Vehicle turning is affected by vehicle operating conditions in that cornering stiffness of a given tire typically varies with operational parameters. Typical operating parameters that are known to affect vehicle turning include tire inflation pressure, vehicle normal load, operator demand for braking effort, lateral force, and suspension characteristics, all of which tend to further vary with operating time, vehicle usage, and ongoing vehicle wear. Furthermore, in a steer-by-wire system, wherein there is no direct mechanical linkage between the steering wheel and the vehicle wheels, any system change in terms of ability to sense operator input or position of the turning wheels, or in responsiveness of the wheel turning motors, may affect vehicle responsiveness to steering input, resulting in either understeer or oversteer. In summary, control of wheel motor speed alone may not provide consistent or sufficient responsiveness in the steering system.

Therefore, what is needed is a system that is able to determine a desired turning radius for a vehicle, and is operable to provide coordinated control of torque and speed of the wheel motors.

SUMMARY OF THE INVENTION

A vehicle operator negotiates a turn by rotating the vehicle steering wheel, thus commanding a steering angle. The steering angle is typically sensed by a steering wheel sensor in a steer-by-wire system. Steering error, also referred to as understeer, occurs when the steering wheel is turned a specific amount, indicating a commanded steering radius $R_D$, whereas an actual steering radius, R, deviates therefrom. A measure of vehicle understeer, is the yaw-rate error, K, measured in units of radians per second, or degrees per second. The yaw-rate error is typically influenced by static normal load on the front and rear tires and cornering stiffness of the tires. When the coefficient, K, is greater than zero, i.e. a positive number, vehicle understeer is indicated, meaning the vehicle's actual turning radius is more than commanded turning radius. When the coefficient, K, is less than zero, i.e. a negative number, vehicle oversteer is indicated, meaning the vehicle's actual turning radius is smaller than the commanded turning radius. The coefficient, K, varies with vehicle operating conditions, primarily because cornering stiffness of a given tire varies with operational parameters including inflation pressure, normal load, braking effort, and lateral force. Therefore it is important to maintain the effective coefficient, K, within a certain desired level to provide stable and consistent vehicle behavior.

In accordance with the present invention, a method and system providing coordinated torque control and speed control of wheel motors to achieve a desired yaw moment for the vehicle, based upon operator input and vehicle operation is described. The present invention comprises a system and method to control a vehicle equipped with a plurality of individual wheel motors, a steering system, and yaw-rate detection, including determining a commanded steering angle, and determining a yaw-rate error, based upon the commanded steering angle and a detected yaw-rate. Inner and outer motored wheels are identified, based upon the commanded steering angle. A desired wheel motor yaw torque moment is calculated. A first torque is calculated for each of the inner motored wheels, and a second torque is calculated for each of the outer motored wheels, based upon the calculated desired wheel motor yaw torque moment. A first ideal wheel speed is calculated for each of the inner motored wheels, and, a second ideal wheel speed is calculated for each of the outer wheels, based upon the commanded steering angle. Torque and speed at each inner motored wheel and each outer motored wheel are calculated, based upon the yaw-rate error, the first and second torque moments, and the first and second ideal wheel speeds.

Another aspect of the invention comprises controlling the speed each of the inner motored wheels and each of the outer motored wheels, based upon the yaw-rate error, and the first and second ideal wheel speeds only when the determined yaw-rate error is less than a threshold.

Another aspect of the invention comprises determining a linear range of torque control for each individual wheel motor between a propulsion torque limit and a regenerative braking limit, and, determining the desired wheel motor yaw torque moment based upon the linear range of torque control for each individual wheel motor.

Another aspect of the invention comprises determining each of the wheel motors to be in an operating mode comprising one of a motoring mode, a regenerative braking mode, and a free-wheeling mode, then determining magnitude and direction of vehicle understeer. The magnitude of the first torque moment and magnitude of the second torque moment are determined based upon the magnitude and the direction of vehicle understeer and the determined operating mode.

Another aspect of the invention comprises determining an ideal vehicle turning radius based upon the commanded steering angle; and, calculating an ideal ratio of inner and outer wheel speeds based upon the ideal vehicle turning radius.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT

Figure 1:
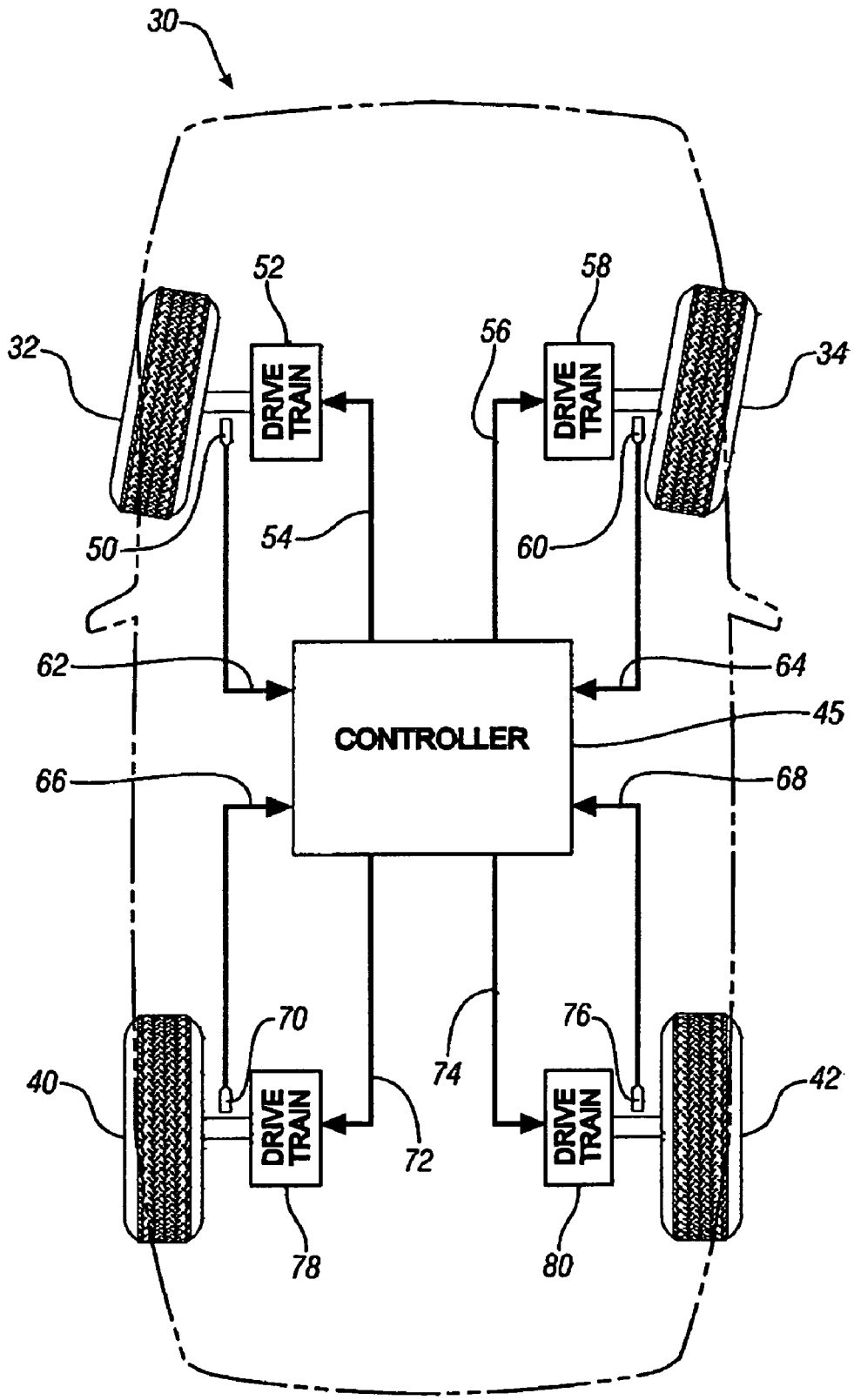
FIG. 1 is a schematic diagram of a vehicle system, in accordance with the present invention.

Referring now to the drawings, wherein the showings are for the purpose of illustrating the invention only and not for the purpose of limiting the same, FIG. 1 shows an exemplary vehicle 30 which has been constructed in accordance with an embodiment of the present invention. Vehicle 30 includes four motored wheels, comprising front steering wheels 32, 34 and rear wheels 40, 42, each having one of motors 52, 58, 78 and 80 driving the four wheels, and electronic controller 45 controlling the drive trains 52, 58, 78 and 80. Each of the motored wheels 52, 58, 78, and 80 preferably comprises a known electrical motor device, operable to convert electrical energy to rotational torque to cause linear motion of the vehicle, and further operable to generate electrical power by converting linear momentum of the vehicle to rotational braking torque via technology commonly referred to as regenerative braking. Individual wheel speeds and a measure of vehicle speed are determined by controller 45 in response to signals sensed by sensors 50, 60, 70 and 76 and fed to controller 45 through lines 62, 64, 66 and 68.

The exemplary vehicle 30 includes a steer-by-wire system (not shown), including a plurality of angle position sensors, a steering wheel angle position sensor, and a steering actuation system. The sensors are signally connected to the controller, and the steering actuation system is operably connected to the controller 45. Each angle position sensor is operable to measure steering angle of one of the vehicle wheels used for steering, in this embodiment being the front wheels of the vehicle. The steering wheel angle position sensor is operable to measure operator input, which comprises the commanded steering wheel angle. There are other aspects to mechanization and control of a typical steer-by-wire not described in detail, but known to one skilled in the art. Vehicle 30 includes a yaw-rate sensing system, operable to determine yaw-rate of the vehicle, based upon input from a yaw-rate sensor (not shown); The yaw-rate sensor is generally known to one skilled in the art, and preferably includes an output signal correlatable to instantaneous vehicle yaw.

The controller 45 is operable to monitor input from the aforementioned sensors, and control the steering actuation system using control algorithms described hereinafter. The controller preferably comprises an electronic device having at least one microprocessor, memory storage in the form of RAM and various ROM devices, and an analog-to-digital signal converter, and output drivers, all interconnected via data buses. The controller is preferably signally attached to sensors and operably attached to output devices to monitor and control vehicle operation. Sensors preferably include the steering wheel angle position sensor, the yaw-rate sensor, and accelerator pedal position sensor, among others (not shown). Typical output devices include the steering actuation system, throttle/traction control systems, and anti-lock braking systems. The controller controls vehicle operation by collecting input from the sensors and controlling the output devices, using control algorithms and calibrations internal to the controller and input from the various sensors. The use of an electronic controller to control vehicle operation using output devices based upon input from various sensors is well known. The process of developing, designing, executing, and calibrating a plurality of algorithms in a controller is known to one skilled in the art, and not disclosed in detail herein.

When an operator turns the steering wheel of the vehicle, thus commanding a turn, the wheels closest to center of a turning radius are referred to as inner wheels, and wheels farthest from the center of the turning radius are referred to as outer wheels. Referring to FIG. 1, the vehicle 30 having four motored wheels 32, 34, 40, and 42 is shown with front wheels 32, 34 turned right. Wheels 34, 42 are inside wheels and wheels 32, 40 are outside wheels. In a situation wherein the vehicle turns left, wheels 32, 40 are the inside wheels and wheels 34, 42 are the outside wheels.

Figure 2:
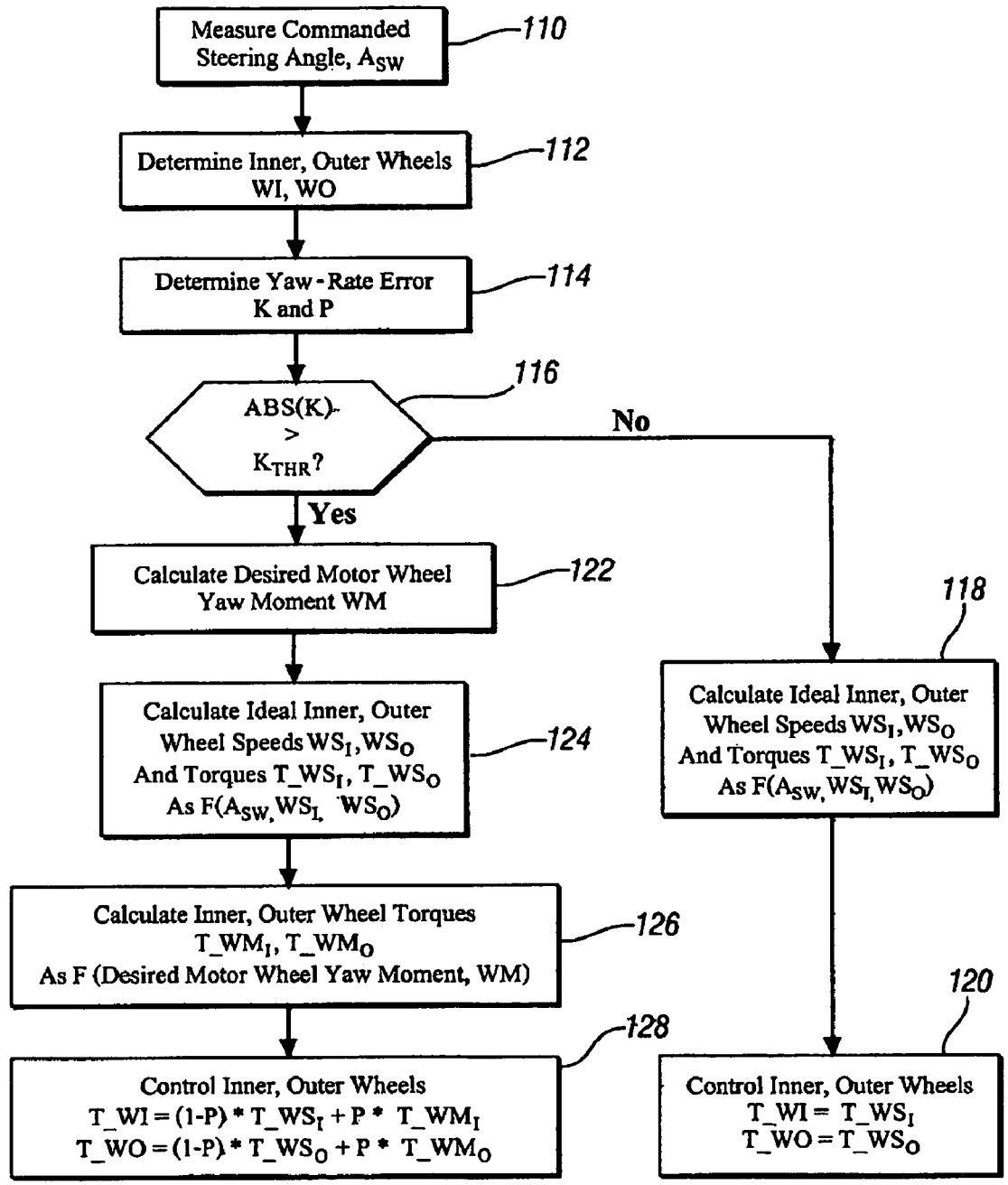
FIG. 2 is a schematic diagram of a control algorithm, in accordance with the present invention.
Figure 3:
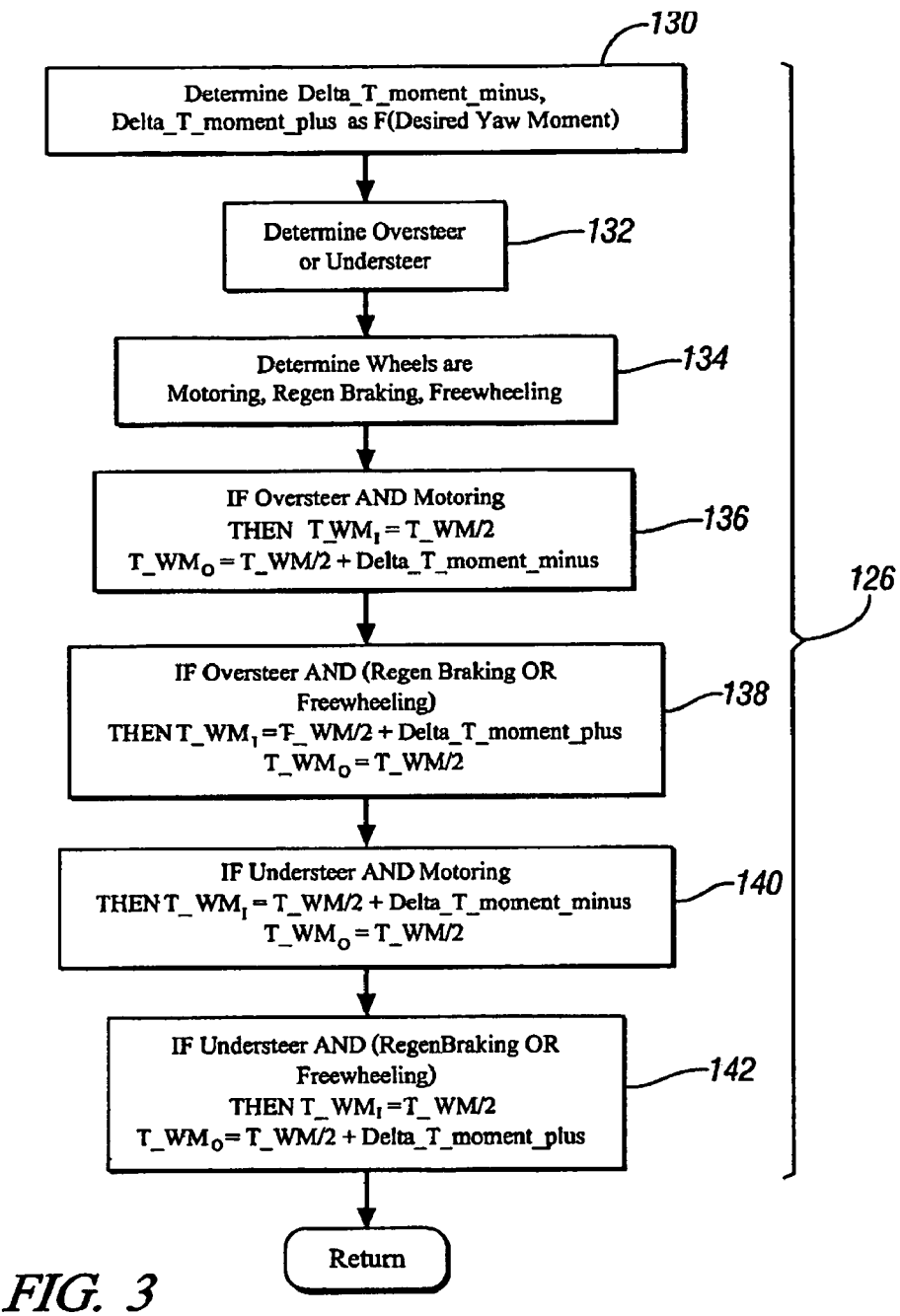
FIG. 3 is a schematic diagram of detailed aspects of the control algorithm, in accordance with the present invention; and, FIG. 4 is a data graph representative of a calibration, in accordance with the present invention.
Figure 4:
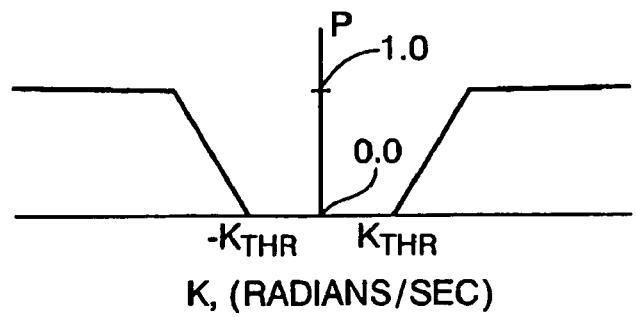

Referring now to FIGS. 2-4, a method to control the vehicle 30 equipped with wheels 32, 34, 40, 42 having individual wheel motors 52, 58, 78, 80, the steer-by-wire steering system, and yaw-rate detection, is described. The method is preferably executed as one or more software algorithms executed in the controller 45, using predetermined calibration thresholds. Through the controller 45, the algorithms are able to collect information from the aforementioned sensors, execute logic strategies, and compel the controller to control various output devices, consistent with the described control strategy and in concert with other ongoing control strategies known but not discussed herein. The described algorithms are preferably regularly executed by the controller 45 as part of ongoing vehicle control and operation, typically at least once every 3.125 milliseconds.

Referring again to FIG. 2, the method preferably comprises determining a commanded steering angle, $A_{SW}$, based upon input from the steering sensor (Block 110). The controller is operable to identify the specific wheels comprising inner motored wheels and outer motored wheels, for each turning event, based upon the commanded steering angle (Block 112), as discussed hereinabove. A commanded yaw-rate is computed based on the commanded steering angle, $A_{SW}$. Yaw-rate error, K, is determined, preferably comprising a difference between the commanded yaw-rate, and vehicle yaw-rate, and expressed in units of radians per second (Block 114). A proportional term, P, is determined, based upon yaw-rate error, K. The proportional term, P, is a calibratable value determined by a skilled practitioner, and comprises a ratiometric value between 0.0 and 1.0. Determination of the proportional term P is shown with reference to FIG. 4, wherein an exemplary calibration curve is shown, with yaw-rate error, K on the x-axis, and proportional term, P on the y- axis. Also shown is a minimum threshold coefficient, $K_{THR}$, calibratable by a skilled practitioner.

An absolute value of the yaw-rate error is compared to the threshold coefficient, $K_{THR}$ (Block 116). When the absolute value of the yaw-rate error is less than the threshold coefficient, $K_{THR}$, the vehicle system controls steering, utilizing only a speed control algorithm (Blocks 118, 120). The preferred method for calculating ideal speed ratio and controlling wheel speed during understeer has been previously described in U.S. Pat. No. 5,258,912, entitled Wheel Understeer Speed Control, issued to Ghoneim, et al., hereinabove incorporated by reference, and not described in detail herein. The preferred output of the exemplary method for calculating ideal speed ratio and controlling wheel speed during understeer comprises ideal inner and outer wheel speeds, $WS_I$, $WS_O$, (radian/second). When the absolute value of the yaw-rate error is greater than the threshold coefficient, $K_{THR}$, the vehicle system controls steering utilizing the aforementioned speed control algorithm in concert with a torque control algorithm, described hereinafter (Blocks 122, 124, 126, 128).

Steering control utilizing the speed control algorithm in concert with the torque control algorithm preferably comprises first calculating desired motored wheel yaw moment, WM (Block 122). This preferably comprises determining desired forward propulsion of the vehicle, considering operator inputs including an accelerator pedal position, cruise control setting, and brake pedal position. An overall desired yaw moment is first calculated through a control algorithm known to those skilled in the art based on yaw-rate error. Calculating the portion of the overall desired yaw moment that is to be the desired yaw moment to be commanded from the wheel motors, WM, includes determining a linear range of torque control for each individual wheel motor between a propulsion torque limit and a regenerative braking limit. The linear range of torque control for each individual wheel motor is typically a known performance feature of a motored wheel, and comprises determining propulsion torque limit and regenerative braking limit based upon the size and type of wheel motor coupled with other factors related primarily to friction and inertial losses, energy conversion efficiencies, energy storage capabilities, and various environmental factors. The linear range of torque control is preferably determined during vehicle design and development, and generally serves as a calibratable input to the controller 45. An important feature of the linear range of wheel motor torque control is that the controller is unable to effect torque control of the wheel motor outside the linear range of operation. Therefore algorithms for controlling wheel motor torque may not function as intended when the linear range is exceeded. Determining desired forward propulsion of a vehicle is typically known and not described in detail.

When the desired motored wheel yaw moment, WM, is calculated (Block 122), and determined to be within the linear range of torque control for each wheel motor, then the desired wheel motor torque is calculated for each individual wheel motor, based upon the linear range of torque control of the motor, radius of each tire and wheel, and other known factors. Inner and outer wheel motor torques, $T\_WM_I$, $T\_WM_O$, are then calculated (Block 126). A first and a second ideal wheel speed are calculated, $WS_I$, $WS_O$, respectively, for each of the inner motored wheels and the outer motored wheels, based upon the commanded steering angle (Block 124). This comprises determining an ideal vehicle turning radius based upon the commanded steering angle; and, calculating an ideal ratio of inner and outer wheel speeds based upon the ideal vehicle turning radius. The preferred method for calculating ideal speed ratio and controlling wheel speed during understeer has been previously described in U.S. Pat. No. 5,258,912, entitled Wheel Understeer Speed Control, issued to Ghoneim, et al., hereinabove incorporated by reference, and not described in detail. The preferred output of the exemplary method for calculating ideal speed ratio and controlling wheel speed during understeer comprises the ideal inner and outer wheel speeds, $WS_I$, $WS_O$, expressed in units of radians per second. A feedback controller calculates the torques, $T\_WS_I$, and $T\_WS_O$, required to achieve the ideal inner and outer wheel speeds, respectively.

Referring now to FIG. 3, calculations of inner and outer wheel motor torques, $T\_WM_I$, $T\_WM_O$, referred to in Block 126 of FIG. 2, are described in detail. The calculation of the wheel motor torques comprises a first torque calculated for each of the inner motored wheels, in this embodiment comprising wheels 34, 42, and a second torque calculated for each of the outer motored wheels, in this embodiment comprising wheels 32, 40. Each torque is calculated based upon the calculated desired wheel motor torque, T_WM. This comprises calculating a torque offset, used to offset the desired wheel motor torque to the inner and outer wheels. Torque to the inner wheels preferably comprises half of the total desired wheel motor torque, T_WM, decreased by the torque moment offset, Delta_T_moment_minus. Torque to the outer wheels preferably comprises half of the total desired wheel motor torque increased by the torque offset, Delta_T_moment_plus (Block 130).

Referring again to FIG. 3, it is determined whether the vehicle is in an understeer event or an oversteer event, i.e. the whether the yaw-rate error or coefficient, K, is a positive value or a negative value (Block 132). The magnitude of K is determined. The operating mode of each of the wheel motors is identified as one of motoring mode, regenerative braking mode, and free-wheeling mode (Block 134). The wheel motor torques for the inner motored wheels, $T\_WM_I$, and the outer motored wheels, $T\_WM_O$, are calculated, based upon the magnitude and the direction of K, and the determined operating mode. This is shown in detail in blocks 136, 138, 140, and 142 of FIG. 3.

Referring again to FIG. 2, the motor torque and speed of each of the inner motored wheels and each of the outer motored wheels are controlled, based upon the yaw-rate error, the first and second torques, and the first and second ideal wheel speeds (Block 128). This comprises controlling the torque output to the inner wheels, T_WI, by proportionally balancing the magnitude of the first torque (expressed in units of Newton-meters) based upon desired wheel motor torque, relative to magnitude of the first torque required to control to an ideal wheel speed (expressed in units of Newton-meters), and, controlling torque output to the outer wheels, T_WO, by proportionally balancing magnitude of the second torque based upon desired wheel motor torque, relative to magnitude of the second torque required to control to an ideal wheel speed. In the exemplary case, proportionally balancing the torque moment and wheel speeds based upon the yaw-rate error comprises multiplying the calculated wheel motor torques to achieve desired wheel motor yaw moment by P, determined as a calibratable function of the yaw-rate error, and multiplying the calculated torques to achieve speed control by factor (1-P). Once the torque output to the outer wheels, T_WO, and the torque output to the inner wheels, T_WI, has been determined, the controller is operable to appropriately control each of the motored wheels using known control strategies for operating individual wheel motors having regenerative braking systems, in coordination with other control schemes.

The controller is operable to disable the algorithm comprising the control system when it is determined that a control device within the vehicle is engaged in alternative control of the vehicle propulsion system which could interfere with proper operation of the instant system. Alternative control may be in the form of a controller implementing anti-lock braking in response to an operating event, or a controller engaged in traction control. These systems are not described in detail. However, a skilled vehicle propulsion system implementer is able to develop and execute a priority scheme which considers the various vehicle control systems and appropriately selects a scheme which meets operator needs and requirements for effectively operating and controlling the vehicle.

The invention has been described with specific reference to the preferred embodiments and modifications thereto. The exemplary embodiment describes a method and system for controlling a vehicle system having four independently controlled motored wheels, to keep the vehicle on a reference path in response to a steering command by the operator. It is understood that there are possible other embodiments upon which the method and system may effectively operate. The invention may be implemented on any vehicle system in which left and right drive wheels may be independently motored and controlled utilizing independent power trains, or by utilizing a single powertrain and a brake modulator system for the left and right wheels, such as individual anti-spin brake actuators. Alternate embodiments include, but are not limited to vehicles with rear wheel steering, and vehicles with four-wheel steering. The invention is applicable to vehicles having four-wheel drive systems, two-wheel drive systems, and, all-wheel drive systems. The system is equally applicable to systems with steer-by-wire, a conventional mechanical steering system, and to vehicles employing center-articulation to effect steering. Further modifications and alterations may occur to others upon reading and understanding the specification. It is intended to include all such modifications and alterations insofar as they come within the scope of the invention.

The invention claimed is:

1. Method to control a vehicle equipped with a plurality of individual wheel motors, a steering system, and yaw-rate detection, comprising:
    determining a commanded steering angle;
    identifying at least one inner motored wheel and at least one outer motored wheel, based upon the commanded steering angle;
    determining a yaw-rate error;
    calculating a desired wheel motor yaw moment based on a linear range of torque control of the wheel motors;
    calculating a first torque for each of the inner motored wheels and calculating a second torque for each of the outer motored wheels, said first and second torques being calculated based on the desired wheel motor yaw moment;
    calculating a first ideal wheel speed for each of the inner motored wheels and calculating a second ideal wheel speed for each of the outer wheels; and,
    controlling torque and speed of each of the inner motored wheels and each of the outer motored wheels, based upon the yaw-rate error, the first and second torques, and the first and second ideal wheel speeds.

2. The method of claim 1, further comprising: controlling the speed of each of the inner motored wheels and each of the outer motored wheels, based upon the yaw-rate error and the first and second ideal wheel speeds when the determined yaw-rate error is less than a threshold.

3. The method of claim 1, wherein calculating a desired wheel motor yaw moment comprises:
    determining a linear range of torque control for each individual wheel motor between a propulsion torque limit and a regenerative braking limit; and,
    determining the desired wheel motor yaw moment based upon the linear range of torque control for each individual wheel motor.

4. The method of claim 3, wherein calculating a first torque for each of the inner motored wheels and calculating a second torque for each of the outer motored wheels further comprises:
    determining each of the wheel motors to be in an operating mode comprising one of a motoring mode, a regenerative braking mode, and a free-wheeling mode;
    determining magnitude and direction of vehicle understeer; and,
    calculating magnitude of the first torque and magnitude of the second torque based upon the magnitude and the direction of vehicle understeer and the determined operating mode.

5. The method of claim 4, wherein calculating a first ideal wheel speed for each of the inner motored wheels and calculating a second ideal wheel speed for each of the outer wheels:
    determining an ideal vehicle turning radius based upon the commanded steering angle; and,
    calculating an ideal ratio of inner and outer wheel speeds based upon the ideal vehicle turning radius.

6. The method of claim 1, wherein controlling torque and speed of each of the inner motored wheels and each of the outer motored wheels, based upon the yaw-rate error, the first and second torques, and the first and second ideal wheel speeds, comprises:
    balancing proportionally a magnitude of the first torque relative to a magnitude of the first torque needed to achieve ideal wheel speed, based upon the yaw-rate error; and,
    balancing proportionally a magnitude of the second torque relative to a magnitude of the second torque needed to achieve ideal wheel speed, based upon the yaw-rate error.

7. The method of claim 1, wherein determining a commanded steering angle and determining a yaw-rate error, further comprises: identifying a fault in the vehicle steering system.

8. System for controlling motor wheels of a vehicle, comprising:
    a plurality of individually controlled wheel motors, comprising at least one wheel motor for an inner wheel and at least one wheel motor for an outer wheel;
    a steering system, comprising a steering wheel, a steering command sensor, and a means for steering the vehicle;
    a yaw-rate detector; and,
    an electronic controller: signally connected to the steering command sensor, and, the yaw-rate detector; and, operably connected to each of the plurality of individually controlled wheel motors; the electronic controller operable to:

determine a commanded steering angle;

identify the at least one inner motored wheel and the at least one outer motored wheel;

determine a yaw-rate error;

calculate a desired wheel motor yaw torque moment;

calculate a first torque for each of the inner motored wheels;

calculate a second torque for each of the outer motored wheels;

calculate a first ideal wheel speed for each of the inner motored wheels;

calculate a second ideal wheel speed for each of the outer wheels; and, control torque and speed of each of the inner motored wheels and each of the outer motored wheels, based upon the yaw-rate error, the first and second torques, and the first and second ideal wheel speeds.

* * * * *